United States Patent
Patel et al.

(10) Patent No.: US 8,077,842 B2
(45) Date of Patent: Dec. 13, 2011

(54) SYSTEM AND METHOD FOR ASSOCIATING DUE DATES WITH MESSAGES

(75) Inventors: Labhesh Patel, Mountain View, CA (US); Johnny H. Lee, Mountain View, CA (US); Fadi R. Jabbour, Sunnyvale, CA (US); David C. Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1233 days.

(21) Appl. No.: 11/137,049

(22) Filed: May 25, 2005

(65) Prior Publication Data

US 2006/0285661 A1    Dec. 21, 2006

(51) Int. Cl.
   *H04M 1/64* (2006.01)
(52) U.S. Cl. .............. 379/88.23; 370/352; 379/88.12; 379/88.19; 379/142.08; 379/207.03; 379/210.01; 455/412.2; 709/203; 709/228
(58) Field of Classification Search . 379/201.01–207.03, 209.01, 210.01–210.03, 379/211.01, 67.1–88.28, 142.06, 142.08, 379/214.01, 208.01–215.01, 265.01–266.1; 370/259–271, 351–356; 455/412.1–417; 709/201–203, 226–229; 704/270, 270.1
See application file for complete search history.

(56) References Cited

U.S. PATENT DOCUMENTS

| | | | | |
|---|---|---|---|---|
| 5,155,761 A | * | 10/1992 | Hammond | 379/88.2 |
| 5,185,782 A | * | 2/1993 | Srinivasan | 379/210.01 |
| 5,528,676 A | | 6/1996 | Sussell et al. | 379/111 |
| 5,742,674 A | * | 4/1998 | Jain et al. | 379/210.01 |
| 5,878,230 A | * | 3/1999 | Weber et al. | 709/238 |
| 5,923,848 A | | 7/1999 | Goodhand et al. | 709/219 |
| 5,933,477 A | * | 8/1999 | Wu | 379/88.26 |
| 6,072,867 A | * | 6/2000 | Lieuwen | 379/220.01 |
| 6,137,864 A | * | 10/2000 | Yaker | 379/88.22 |
| 6,212,553 B1 | * | 4/2001 | Lee et al. | 709/206 |
| 6,321,093 B1 | | 11/2001 | Dalal | 455/512 |
| 6,327,046 B1 | * | 12/2001 | Miyamoto et al. | 358/1.15 |
| 6,405,035 B1 | | 6/2002 | Singh | 455/414 |
| 6,427,009 B1 | | 7/2002 | Reese | 379/215 |
| 6,438,217 B1 | * | 8/2002 | Huna | 379/88.14 |
| 6,453,023 B1 | | 9/2002 | McCkee | |
| 6,507,643 B1 | * | 1/2003 | Groner | 379/88.14 |
| 6,535,506 B1 | * | 3/2003 | Narain et al. | 370/352 |
| 6,542,591 B1 | | 4/2003 | Amro et al. | 379/142 |
| 6,549,950 B2 | | 4/2003 | Lytle et al. | 709/246 |

(Continued)

FOREIGN PATENT DOCUMENTS

JP    11177616    7/1997

OTHER PUBLICATIONS

U.S. Appl. No. 11/173,052, entitled "Method and System for Providing a Contact Attempt Service," filed Jul. 1, 2005, 32 pages.

(Continued)

*Primary Examiner* — Hemant Patel
(74) *Attorney, Agent, or Firm* — Baker Botts L.L.P.

(57) ABSTRACT

A method for providing communication service includes determining that a call was not answered by an intended recipient of the call and determining a due date associated with the call. The method also includes communicating the due date to the intended recipient.

25 Claims, 3 Drawing Sheets

U.S. PATENT DOCUMENTS

| | | | |
|---|---|---|---|
| 6,711,248 B1 * | 3/2004 | Haber et al. | 379/210.01 |
| 6,721,784 B1 | 4/2004 | Leonard et al. | 709/206 |
| 6,738,461 B2 | 5/2004 | Trandal et al. | 379/142 |
| 6,779,020 B1 * | 8/2004 | Henrick | 709/206 |
| 6,799,017 B1 | 9/2004 | Kregel | 455/70 |
| 7,133,504 B2 * | 11/2006 | Fostick | 379/88.14 |
| 7,139,800 B2 * | 11/2006 | Bellotti et al. | 709/206 |
| 7,145,998 B1 * | 12/2006 | Holder et al. | 379/210.01 |
| 7,177,404 B2 * | 2/2007 | Rosenthal | 379/88.17 |
| 7,212,614 B1 * | 5/2007 | Burg et al | 379/88.18 |
| 7,403,770 B2 * | 7/2008 | Hayashi | 455/417 |
| 2002/0147986 A1 * | 10/2002 | Michael et al. | 725/110 |
| 2002/0160757 A1 * | 10/2002 | Shavit et al. | 455/414 |
| 2002/0169841 A1 * | 11/2002 | Carlson et al. | 709/206 |
| 2002/0186828 A1 * | 12/2002 | Bushnell | 379/211.02 |
| 2003/0018724 A1 * | 1/2003 | Mathewson et al. | 709/206 |
| 2003/0060198 A1 * | 3/2003 | Li | 455/434 |
| 2003/0065628 A1 * | 4/2003 | Gargiulo | 705/401 |
| 2003/0105827 A1 * | 6/2003 | Tan et al. | 709/206 |
| 2004/0249890 A1 * | 12/2004 | Fellenstein et al. | 709/206 |
| 2005/0047562 A1 * | 3/2005 | Holz et al. | 379/88.22 |
| 2006/0153347 A1 * | 7/2006 | Clark et al. | 379/88.18 |
| 2006/0159067 A1 | 7/2006 | Chen et al. | 370/352 |
| 2006/0210029 A1 | 9/2006 | Okon | 379/88 |
| 2007/0015497 A1 | 1/2007 | Patel et al. | |
| 2007/0201659 A1 * | 8/2007 | Altberg et al. | 379/201.01 |
| 2008/0095355 A1 * | 4/2008 | Mahalaha et al. | 379/265.09 |
| 2008/0247529 A1 * | 10/2008 | Barton et al. | 379/211.01 |

OTHER PUBLICATIONS

USPTO; Office Action for U.S. Appl. No. 11/173,052 (14 pages), Oct. 16, 2007.
USPTO; Office Action for U.S. Appl. No. 11/173,052 (14 pages), Apr. 16, 2008.
USPTO; Office Action for U.S. Appl. No. 11/173,052 (18 pages), Oct. 8, 2008.
USPTO; Office Action for U.S. Appl. No. 11/173,052 (16 pages), Oct. 19, 2009.
Patel et al. U.S. Patent and Trademark Office communication mailed Apr. 20, 2009 for U.S. Appl. No. 11/173,052.
Patel et al., U.S. Appl. No. 11/173,052, U.S. Patent and Trademark Office communication, Final Office Action mailed Jun. 22, 2010.
Patel et al., U.S. Appl. No. 11/173,052, U.S. Patent and Trademark Office communication, Office Action mailed Mar. 31, 2011.
Patel et al., US. Appl. No. 11/173,052, U.S. Patent and Trademark Office, non-final response mailed Jul. 22, 2011.

* cited by examiner

US 8,077,842 B2

SYSTEM AND METHOD FOR ASSOCIATING DUE DATES WITH MESSAGES

TECHNICAL FIELD OF THE INVENTION

This invention relates in general to communication systems and, more particularly, to a system and method for associating due dates with messages.

BACKGROUND OF THE INVENTION

Recipients of messages, such as voicemail messages, often find it inconvenient to immediately respond to received messages. However, if the sender of the message required a response by a particular time, delay in responding to a message may result in a missed deadline. Unfortunately, users are typically unable to determine the priority of a particular message without taking the time to listen to that message. As a result, users may be forced to unnecessarily listen to or respond to messages of low priority to ensure that high priority messages are addressed in a timely manner. Some systems can send missed calls, or voicemails and other types of messages, to a user via electronic mail and/or short message service (SMS) messages.

SUMMARY OF THE INVENTION

In accordance with the present invention, at least some of the disadvantages and problems associated with communication systems have been substantially reduced or eliminated. In particular, a system and method for associating due dates with messages is provided.

In accordance with one embodiment of the present invention, a method for providing communication service includes determining that a call was not answered by an intended recipient of the call and determining a due date associated with the call. The method also includes communicating the due date to the intended recipient.

In accordance with another embodiment of the present invention, a device for providing communication service includes a memory and a processor. The memory is capable of storing processor instructions. The processor is capable of determining that a call was not answered by a recipient of the call. The processor is also capable of determining a due date associated with the call and scheduling a task associated with the call based on the due date.

Technical advantages of certain embodiments of the present invention include a technique for providing a call or message recipient with useful information regarding a deadline associated with a response to the call or message. This may provide a message recipient with important information regarding the message, such as the date or time by which the recipient needs to listen to and/or respond to the call, without requiring the user to return to his phone and without requiring the recipient to listen to the message, thus saving time and expense. Other technical advantages of certain embodiments include greater access to information traditionally stored internally within a message system, automatic generation of a reminder for tasks associated with the received message, a reduced chance that the recipient will forget to respond, and the ability to automatically delegate responsibility for responding to the message to another party or to escalate the appropriate response. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
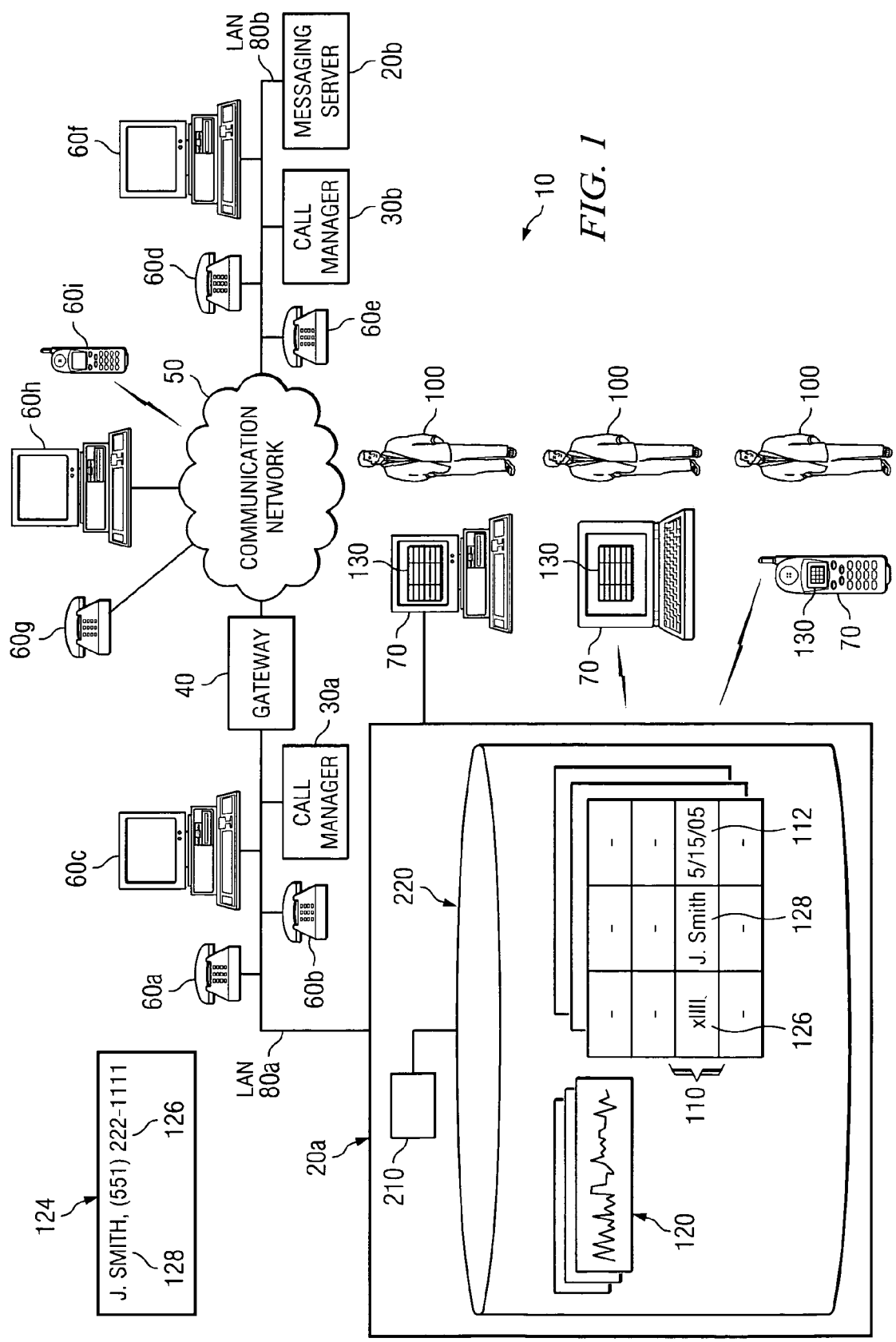
FIG. 1 illustrates a communication system, according to a particular embodiment of the present invention, that supports message service for a plurality of users.

FIG. 1 illustrates a communication system 10 according to a particular embodiment of the present invention. As shown, communication system 10 includes a plurality of local area networks (LANs) 80 coupled by a communication network 50. Each LAN 80 additionally couples a plurality of communication devices 60, a plurality of scheduling devices 70, a messaging server 20, and a call manager 30 to one another and to communication network 50. LAN 80 also includes a gateway 40. As described in greater detail below, messaging servers 20 generate due dates 112 associated with calls that are not answered by their intended recipients.

In general, messaging server 20 may generate due dates 112 for all or any portion of the calls that go unanswered by the relevant recipient (referred to here as "missed calls"). For the purposes of this description, a call may represent any audio, video, and/or text-based communication session and may include signals, data or messages transmitted through voice devices, text chat, web sessions, facsimile, instant messaging and e-mail. Messaging server 20 may additionally use due dates 112 to schedule scheduled tasks 110 that may be accessed by the recipient. In particular embodiments, the recipient may be able to review a due date 112 for a missed call without listening to any message 120 generated as part of the missed call or returning to a communication device that initially receive the missed call. As a result, users 100 may be able to determine the date and/or time by which they need to listen to and reply to callers who leave messages 120 simply by reviewing scheduled tasks 110 assigned to those users 100. Additionally, particular embodiments of messaging server 20 may automatically generate scheduled tasks 110 in response to receiving a missed call, thereby saving the intended recipient the time and effort needed to manually create a scheduled task 110 and reducing the likelihood that the recipient will forget to add the scheduled task 110 prior to the due date 112. Furthermore, messaging server 20 may also be configured to allow the intended recipient to delegate any response to the missed call to another party as the due date 112 approaches or passes. Thus, particular embodiments of communication system 10 may provide several operational benefits as described in greater detail below.

Communication devices 60 may each represent any suitable combination of hardware, software, and/or encoded logic to provide communication services to a user. For example, communication devices 60 may represent telephones; cell phones; computers running telephony, email, or other forms of messaging and/or communication software;

video monitors; cameras; or any other communication hardware, software, and/or encoded logic that supports the communication of voice, video, text or other suitable forms of data using communication system 10. In the illustrated embodiment, communication devices 60a, 60b, 60d, and 60e represent Internet Protocol (IP) telephones and communication devices 60c and 60f represent telephony-enabled personal computers (PCs). Additionally, communication device 60i represents a cellphone coupling to communication system 10 through communication network 50. Although FIG. 1 illustrates a particular number and configuration of communication devices 60, communication system 10 contemplates any number or arrangement of such components to support communication of media.

Gateway 40 comprises any suitable combinations of hardware and/or software that perform translation functions to facilitate seamless communication between communication network 50 and LAN 80a. These functions may include translation between transmission formats and between communications procedures. In addition, gateway 40 may also translate between audio and video CODECs and perform call setup and clearing on both the LAN side and the communication network side. For example, gateway 40 may interface call manager 30a with communication network 50. As a result, when a call is placed by communication device 60g using communication network 50, gateway 40 translates the call format associated with communication network 50 to a call format associated with call manager 30a, such as, for example, SIP or another suitable packet-based communication protocol. Additionally, as suggested by LAN 80b in FIG. 1, LANs 80 particular may not include a gateway 40.

Call managers 30 comprise any suitable combination of hardware and/or software operable to establish a connection between a calling component of communication system 10 and a called component, such as, for example, connecting a call between communication devices 60 or between a particular communication device 60 and messaging server 20. In a particular embodiment, call manager 30 comprises a Voice Over Internet Protocol (VoIP) server that performs the functions of signaling and session management within a packet telephony network. The signaling functionality of call manager 30 allows call information to be carried across network boundaries. The session management functionality of call manager 30 provides the ability to control the attributes of an end-to-end call across multiple networks in communication system 10. For example, in particular embodiments, call manager 30 may support SIP, which is a standard for multimedia conferencing over internet protocol. In such embodiments, call manager 30 may comprise a SIP proxy server that handles all call processing, SIP requests, and SIP responses. Although the following description of call manager 30 is detailed with respect to SIP, it should be understood that call manager 30 may support other IP telephony protocols instead, such as the H.323 protocol. In particular embodiments, call managers 30 may also provide a number of telephony services for communication devices 60 and other devices located in LAN 80, including, but not limited to, call forwarding, teleconferencing, network monitoring, and CODEC translation.

Messaging servers 20 support messaging and other call services for communication devices 60. More specifically, messaging servers 20 may generate messages 120, receive messages 120 generated by other messaging servers 20, store received or generated messages 120, and/or provide users access to stored messages 120. Additionally, messaging servers 20 generate, maintain, and/or disseminate information relating to deadlines and other types of events associated with calls, messages, and scheduled tasks assigned to users of communication system 10. For the purposes of this description, scheduled tasks 110 may each represent any appropriate association of a date and a task, action, or operation to be completed by a user 100 associated with that scheduled task 110. Furthermore, messaging servers 20 may schedule scheduled tasks 110 by generating any appropriate information to associate the due date and an indication of the task to be completed and then storing this information in a manner and location accessible by scheduling devices 70 or communicating this information to scheduling devices 70. Additionally, messages 120 may represent voicemail messages, short message service (SMS) messages, email messages, or messages of any other form, including but not limited to audio, text, and/or video messages.

Messaging servers 20 may store and/or maintain scheduled tasks 110 in a memory 220 in any appropriate form that associates dates and/or times with tasks to be completed. For example, messaging servers 20 may maintain this scheduling information in the form of calendars, task lists, schedule reminders, and/or timers associated with the various users of communication system 10. Messaging servers 20 may each include any appropriate combination of hardware and/or software suitable to provide the described functionality. Messaging server 20 may include any appropriate combination of hardware and/or software suitable to provide the described messaging functionality. In the illustrated embodiment, messaging servers 20 include a processor 210 and memory 220. The contents and operation of particular embodiments of messaging servers 20 are described in greater detail below with respect to FIGS. 2A and 2B.

Scheduling devices 70 facilitate interaction between users of communication system 10 and messaging server 20. Depending on the configuration and capabilities of scheduling devices 70, scheduling devices 70 may communicate with messaging server 20 wirelessly, over a wired network connection, and/or in any other appropriate manner. Additionally, each scheduling device 70 may display scheduling information for a particular user 100 associated with that scheduling device 70 and allow the relevant user to add to or modify scheduling information stored on messaging server 20. Examples of scheduling devices 70 include, but are not limited to, mobile phones, personal digital assistant (PDAs), and/or personal computers (PCs) running appropriate messaging, calendar, task-management, scheduling or personal information manager (PIM) software, such as Microsoft's Outlook or Cisco's Personal Assistant applications. In general, however, each scheduling device 70 may represent any appropriate collection of hardware and/or software suitable to provide the described functionality.

Communication network 50 provides connectivity between components coupled to communication network 50 using any appropriate communication protocols. Communication network may represent any hardware and/or software configured to communicate information in the form of packets, cells, frames, segments or other portions of data. Communication network 50 may include routers, hubs, switches, gateways, call controllers, and/or any other suitable components in any suitable form or arrangement. In general, communication network 50 may represent any combination of public or private communication equipment such as elements of PSTN, a global computer network such as the Internet, a local area network (LAN), a wide-area network (WAN), or other appropriate communication equipment.

LANs 80 provide connectivity between components coupled to LANs 80 using any appropriate communication protocols. Additionally, LANs 80 couple such components to communication network 50 to provide connectivity with components coupled to other LANs 80. LANs 80 may pre represent any hardware and/or software configured to communicate information in the form of packets, cells, frames, segments or other portions of data. LANs 80 may include routers, hubs, switches, gateways, call controllers, and/or any other suitable components in any suitable form or arrangement. In particular embodiments, each LAN 80 represents all or a portion of an Ethernet network connecting the communication devices 60 of a particular entity, such as a company or a university campus.

In operation, messaging server 20 receives or generates due dates 112 to associate with missed calls received by messaging server 20 and provides this information to users 100. More specifically, in particular embodiments of communication system 10, messaging server 20 may provide information specifying due dates 112 associated with missed calls to scheduling devices 70. Scheduling devices 70 may use this information to generate calendar reminders, entries in an assignment list, and/or other types of scheduled tasks for users 100 based on these due dates 112. FIG. 1 illustrates an example of this process with respect to a particular embodiment of communication system 10.

In the example illustrated in FIG. 1, a user (referred to here as the "sender") using a communication device 60, for example communication device 60a, places a call to another user (referred to here as the "recipient") of communication system 10 associated with another communication device 60, communication device 60b in this example. Call manager 30 attempts to connect the incoming call to communication device 60b. If the recipient does not answer the incoming call, call manager 30 may forward the incoming call to messaging server 20 so that the sender can record a message 120 for the recipient. As noted above, a call may represent any audio, video, and/or text-based communication session and may include signals, data or messages transmitted through voice devices, text chat, web sessions, facsimile, instant messaging and e-mail.

In response to receiving the call, messaging server 20 determines a due date 112 for responding to the call or performing any other appropriate task associated with the call. In particular embodiments, due date 112 may correspond to a deadline to respond to a message left by the caller. In general, "due date," as used herein, may represent any particular time and/or date in any suitable form. For example, a due date may include a particular time of a particular day or a period of time. Depending on the configuration and capabilities of messaging server 20, messaging server 20 may generate this due date for all missed calls, for those missed calls for which the caller indicates a desire to set a due date, for missed calls for which the caller records a message 120, for those missed calls for which the caller both records a message 120 and indicates a desire to set a due date, or for any other appropriate subset of missed calls. For example, in particular embodiments, after recording a message 120, messaging server 20 prompts the caller to indicate whether the caller would also like to assign a due date 112 to the message 120.

Additionally, messaging server 20 may determine or generate due dates 112 based on information provided by the caller, information stored by messaging server 20, and/or information from any other suitable source. As one example, messaging server 20 may receive due dates 112 themselves from the caller. More specifically, in particular embodiments, messaging server 20 may prompt the caller to specify a due date 112, before or after recording a message 120. The caller may then specify due date 112 in any appropriate manner. In particular embodiments, the caller may specify due date 112 using a keypad of communication device 60a. In alternative embodiments, messaging server 20 may include voice recognition capabilities and the caller may specify due date 112 verbally as part of recording message 120.

As another example, the caller may indicate a priority level associated with the missed call and messaging server 20 may generate due date 112 based on the priority level associated with the missed call. Additionally, after recording a message 120 for the recipient, the caller may provide additional information to mark the message 120 as urgent. Messaging server 20 may then generate due date 112 for message 120 based on this priority level.

In addition to or instead of using information provided by the caller, messaging server 20 may generate due dates 112 based on predetermined rules stored or generated by messaging server 20. In particular embodiments, messaging server 20 may generate a due date 112 for each missed call that represents the end of the day on which the call was placed. Alternatively, messaging server 20 may generate a due date 112 for missed calls based on the time at which the call was placed. For example, messaging server 20 may add a predetermined time increment, such as twenty-four hours, to the time of the missed call to determine the due date 112 for the missed call. Moreover, the predetermined time increment may vary based on certain characteristics of the missed call, such as the caller or the indicated priority level.

Messaging server 20 may also use information received with the call to generate due date 112. In particular embodiments, messaging server 20 may receive caller identifier ("caller ID") information 124 when a call is forwarded to messaging server 20. Messaging server 20 may use this caller ID information 124 in any suitable manner to determine a due date 112 for missed calls. As one example, caller ID information 124 may include a phone number or other form of device identifier 126. Messaging server 20 may use device identifier 126 or a portion of device identifier 126 to determine due dates 112 for missed calls. For example, messaging server 20 may use a prefix of device identifier 126 to determine that the missed call was made from the recipient's workplace and generate an earlier due date 112 for that missed call. By contrast, messaging server 20 may determine based on the prefix that the missed call was placed from an external phone number and assign a later due date 112 to that missed call. As another example, caller ID information 124 may include a user identifier 128, such as a name or employee number, identifying the caller who placed the missed call. Messaging server 20 may also use user identifier 128 to determine due dates 112 for missed calls. For example, messaging server 20 may assign calls made by the recipient's manager an earlier due date 112 than calls made by other co-workers or external callers.

After determining due date 112, messaging server 20 may generate and/or schedule a scheduled task 110 for the recipient based on the due date 112. As noted above, messaging server 20, in particular embodiments, may support different types of scheduled tasks 110. Depending on the configuration and capabilities of messaging server 20 and scheduling devices 70, these scheduled tasks 110 may represent calendar reminders, scheduled events, entries in a "to-do" list, timers, and or any other appropriate form of scheduled tasks 110. In the described embodiment, scheduled tasks 110 for each user are maintained in task list 130 associated with that user 100.

Scheduled task 110 indicates due date 112 associated with the missed call and other appropriate information to allow user 100 to determine appropriate actions to take in response to the missed call. Additionally, in particular embodiments, scheduled task 110 may identify or include any message 120 that may have been recorded as part of the missed call. In the illustrated embodiment, scheduled task 110 includes a pointer to message 120 recorded by the caller of the missed call. Although shown in FIG. 1, for the sake of illustration, as a text record, scheduled task 110 may represent and/or include information stored in any appropriate form, based on the configuration of messaging server 20 and scheduling devices 70, to allow messaging server 20 and scheduling device 70 to access and process information stored in scheduled task 110.

Once messaging server 20 creates scheduled task 110, users may access scheduled task 110 using scheduling devices 70. In the illustrated embodiment, scheduling devices 70 display task list 130 to users and periodically updates the display task list 130 to include newly created scheduled tasks. As a result, users may be able to determine, based on information provided by scheduling devices 70, due dates 112 associated with messages 120 received by the users without accessing messaging server 20 and listening to message 120.

Additionally, in particular embodiments, messaging server 20 and/or scheduling devices 70 may be configured to monitor due dates 112 of scheduled tasks generated by messaging server 20 and to take appropriate actions as due dates 112 approach or pass. In particular embodiments, scheduling devices 70 may display a reminder within a predetermined time of the due date 112. For example, scheduling device 70 may display a reminder fifteen minutes prior to a due date 112 passing, if the recipient has not indicated that the recipient has returned the call or otherwise taken appropriate actions associated with the missed call.

Particular embodiments of messaging server 20 may also support delegation of tasks associated with the missed call as due date 112 approaches or passes. This may allow the relevant task to be assigned to another party (referred to here as the "delegated party") who may be available to complete the relevant task if the original recipient of the missed call is unavailable to complete the task. For example, messaging server 20 may forward a message 120 recorded as part of the missed call to another user, such as a manager or administrative assistant of the recipient, or otherwise allow another user to listen to message 120, as due date 112 approaches or passes. Depending on the configuration of messaging server 20, such delegation of tasks may or may not result in transfer of the scheduled task 110 created in response to the missed call from a calendar or task list associated with the original recipient to that of the delegated party.

Figure 2:
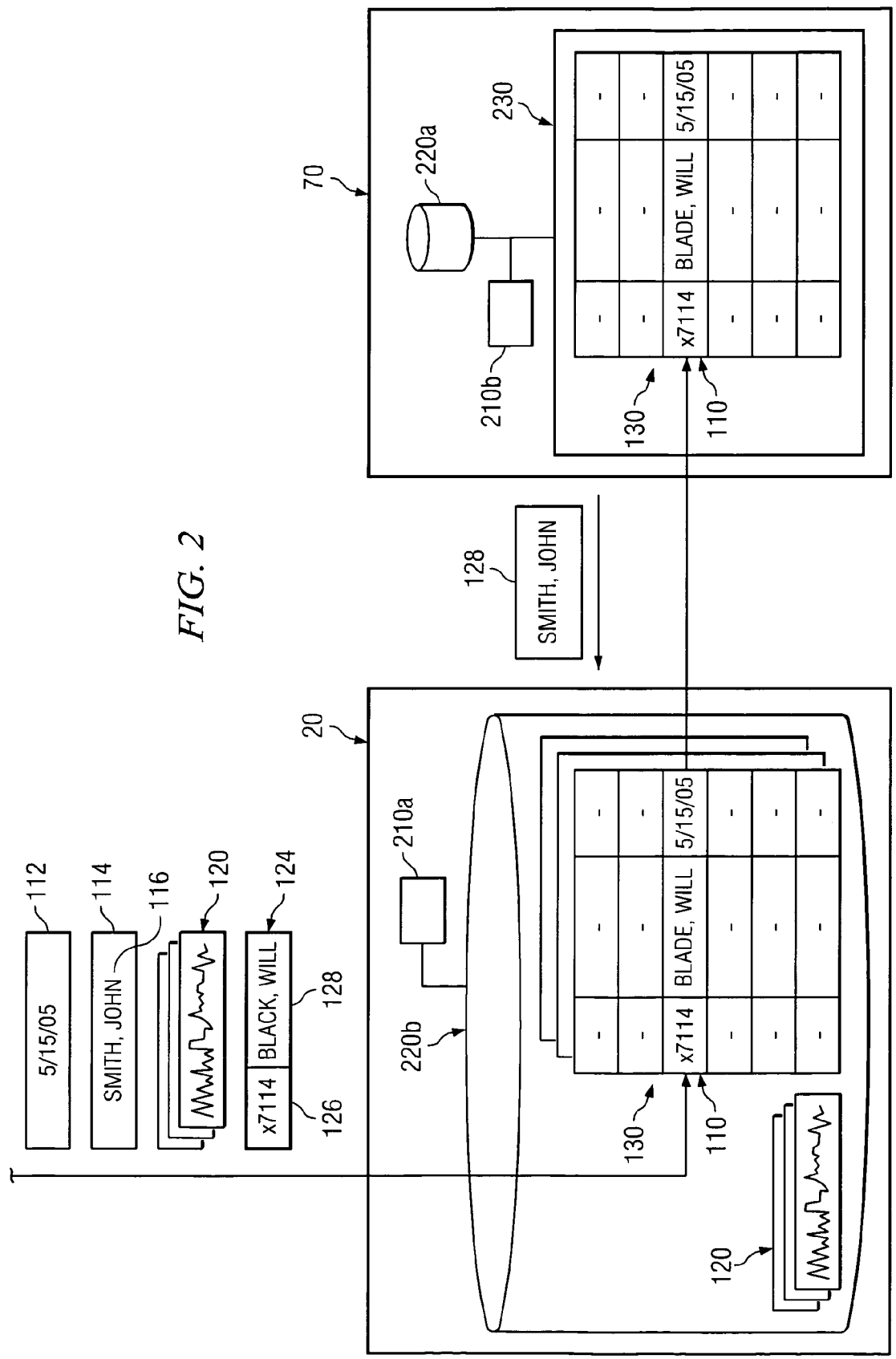
FIG. 2 illustrates operation of a message server and a scheduling device utilized in a particular embodiment of the communication system illustrated in FIG. 1.

FIG. 2 illustrates the contents and example operation of a particular embodiment of messaging server 20 in generating a scheduled task 110 in a task list 130 associated with a particular user 100. Also, shown in FIG. 2 is a scheduling device 70 capable of displaying the generated task list 130 to user 100. As shown, messaging server 20 and scheduling device 70 each include a processor 210 and a memory 220.

Processors 210*a* and 210*b* (referred to generically as "processors 210" collectively or "processor 210" singularly) are operable to execute instructions associated with the services provided by messaging server 20 and scheduling device 70, respectively. Processors 210 may represent any suitable devices capable of processing and/or communicating electronic information. Examples of processor 210 include, but are not limited to, application-specific integrated circuits (ASICs), field-programmable gate arrays (FPGAs), digital signal processors (DSPs) and any other suitable specific or general purpose processors.

Memories 220*a* and 220*b* (referred to generically as "memories 220" collectively or "memory 220" singularly) store processor instructions and/or any other appropriate information used by messaging server 20 and scheduling device 70, respectively, in operation. Memories 220 may represent any collection and arrangement of volatile or non-volatile, local or remote devices suitable for storing data. Examples of memories 220 include, but are not limited to, random access memory (RAM) devices, read only memory (ROM) devices, magnetic storage devices, optical storage devices, or any other suitable data storage devices.

In operation, messaging server 20 generates scheduled tasks 110 associated with missed calls. Messaging server 20 may also record messages 120 from the caller of missed calls. Messaging server 20 may then provide the scheduled tasks 110 to scheduled devices 70 for use by recipient in responding to the missed calls.

In the example shown in FIG. 2, messaging server 20 receives a missed call forwarded by an associated call manager 30. As part of receiving the missed call, messaging server 20 may receive one or more call signaling messages 114, such as Session Initiation Protocol (SIP) Invite messages, that identify the called party for the missed call, such as by including a called party identifier 116 that identifies a recipient for the missed call or by including a called device identifier that identifies a phone number of IP address for a destination device associated with the call. In the illustrated embodiment, messaging server 20 also receives caller ID information 124 that includes a user identifier 128 associated with the caller and a device identifier 126 associated with the communication device 60 being used by the caller to place the missed call. In response to receiving the missed call, messaging server 20 prompts the caller to record message 120 and to provide due date 112, as shown. In particular embodiments, messaging server 20 may, however, prompt the caller only for a due date 112.

Messaging server 20 then generates a scheduled task 110 for the recipient that includes the called party identifier 116, the due date 112 provided by the caller, and the user identifier 128 and device identifier 126 included in caller ID information 124. Scheduled tasks 110 may include any additional information appropriate based on the configuration of messaging server 20 and scheduling devices 70. For example, in alternative embodiments, scheduled task 110 may also include a pointer other type of association linking the scheduled task 110 to the message 120 associated with that scheduled task 110.

Messaging server 20 may then communicate task list 130, scheduled tasks 110, and/or other information associated with missed calls to scheduling device 70 in any appropriate manner. Moreover, messaging server 20 and scheduling device 70 may collectively manage, store, and communicate information pertaining to task list 130 and scheduled tasks 110 in any appropriate manner. For example, in the illustrated embodiment, a user logs into scheduling device 70. Scheduling device 70 then transmits a user identifier 128 identifying the user to messaging server 20 and receives, in response, a task list 130 for the user, which scheduling device 70 then stores in memory 220*b*. Messaging server 20 then transmits new scheduled tasks 110 for the relevant user 100 to scheduling device 70 as these new scheduled tasks 110 are created. In alternative embodiments, scheduling device 70 may maintain a local copy of task list 130 and may contact messaging server 20 periodically to request updates to task list 130 including any newly-created scheduled tasks 110.

As noted above, after receiving task list 130, due dates 112, and/or other appropriate information associated with missed calls from messaging server 20, scheduling device 70 may then display, communicate, or otherwise provide task list 130 to the user 100. In the illustrated embodiment, scheduling device 70 includes a display 230, such as a laptop or PDA screen, and scheduling device 70 displays a textual or graphical representation of task list 130, including scheduled tasks 110, on display 230. Alternative embodiments however may communicate task list 130, scheduled tasks 110, and/or due dates 112 to user 100 as video, audio, or other appropriate forms of data. In general, scheduling device 70 may allow user 100 to access due dates 112 and other information associated with scheduled tasks 110 in any suitable manner.

Figure 3:
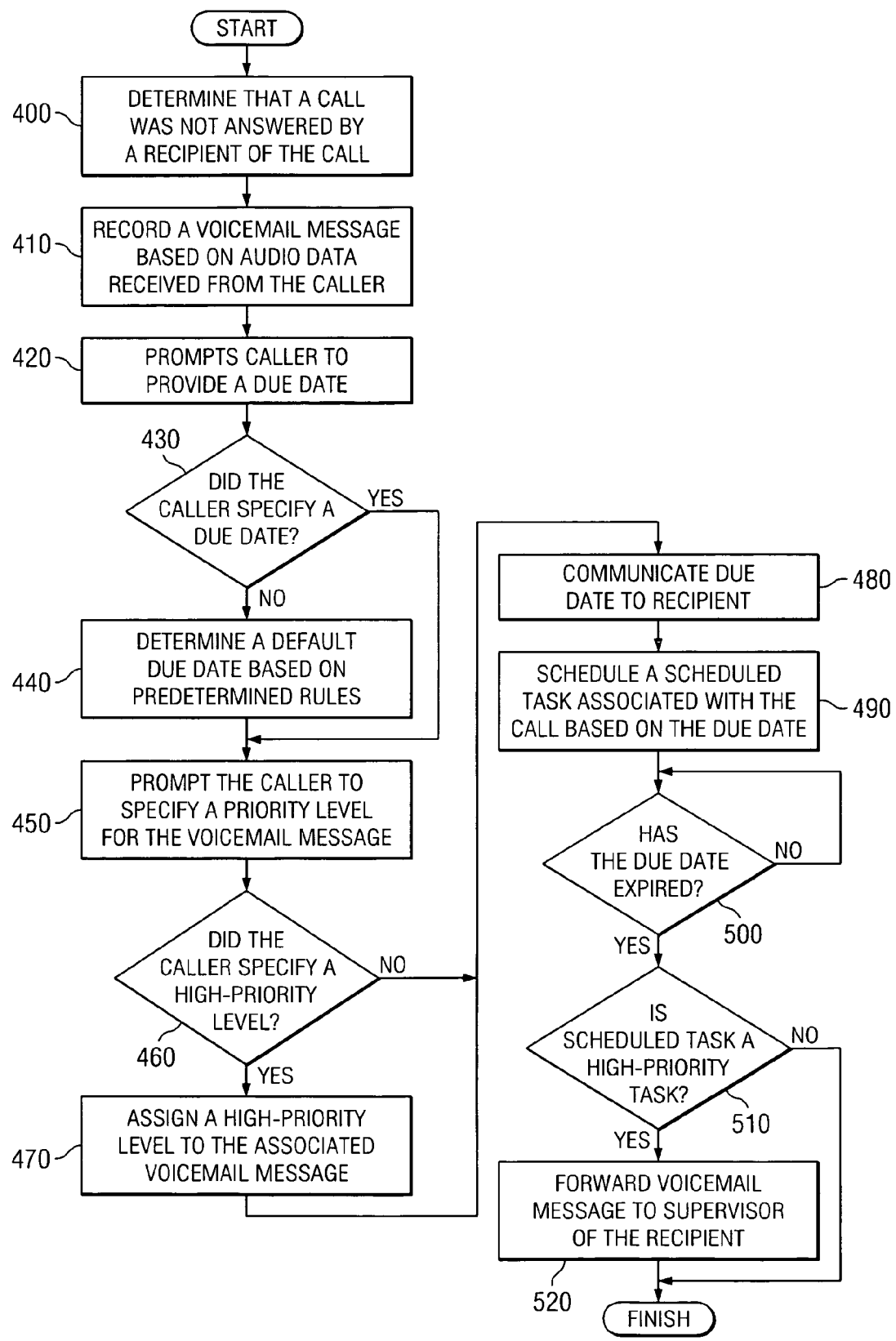
FIG. 3 is a flowchart illustrating a method for associating due dates with messages, in accordance with a particular embodiment.

FIG. 3 illustrates a flowchart describing example operation of a particular embodiment of messaging server 20 in generating scheduled tasks 110 for messages 120 recorded by messaging server 20. In the described embodiment, messaging server 20 generates due dates 112 for these scheduled tasks 110 based on information provided by the caller. As noted above, in alternative embodiments of communication system 10, messaging server 20 may generate due dates 112 based on any other appropriate information.

The described process begins at step 400 with messaging server 20 determining that a call was not answered by a recipient of the call. As noted above, the call may represent any audio, video, and/or text-based communication session and may include signals, data or messages transmitted through voice devices, text chat, web sessions, facsimile, instant messaging and e-mail. In particular embodiments of communication system 10, messaging server 20 determines that the call was not answered as a result of the call being forwarded to messaging server 20 by call manager 30. At step 410, messaging server 20 generates a message 120 based on audio data received from the communication device 60 that the caller is using to place the incoming call. In particular embodiments, messaging server 20 generates message 120 by recording a voicemail message. In general, however, messaging server 20 may generate message 120 in any appropriate manner.

After recording the message 120, messaging server 20 prompts the caller to provide a due date 112 at step 420. For example, messaging server 20 may play an audio prompt requesting that the caller "Please provide a due date for the recorded message." At step 430, messaging server 20 may determine whether the caller specified a due date 112. Depending on the configuration and capabilities of messaging server 20, the caller may specify the due date 112 to messaging server 20 using a keypad of the communication device 60, by verbally communicating the due date 112 to messaging server 20, or in any other appropriate manner. If the caller specifies a due date 112, operation may then continue at step 440.

If the caller did not specify a due date 112, messaging server 20 may, at step 440, determine a default due date 112 based on predetermined rules stored or generated by messaging server 20. As one example, messaging server 20 may determine the default due date 112 based on a time at which the message was generated. As another example, messaging server 20 may determine the default due date 112 based on a sum of a time at which the message was generated and a predetermined time increment.

Messaging server 20 may also prompt the caller to specify a priority level for the message 120 at step 450. For example, messaging server 20 may play an audio prompt requesting that the caller "Please indicate whether this is a high priority call." At step 460, messaging server 20 may determine whether the caller specified a high priority level for the call. Depending on the configuration and capabilities of messaging server 20, the caller may indicate the priority level to messaging server 20 using a keypad of the communication device 60, by verbally communicating the due date 112 to messaging server 20, or in any other appropriate manner. If the caller indicates the call has a high priority level, messaging server 20 may assign a high priority level to the associated message 120 at step 470. Messaging server 20 may assign this high priority level by activating a flag in the header of message 120, by setting a value in or associated with scheduled task 110 to indicate the high-priority level of the associated message 120, and/or by taking any other appropriate actions to assign a priority level to message 120.

At step 480, messaging server 20 then communicates to the intended recipient the due date 112 provided by the caller or the default due date 112 determined by messaging server 20. In particular embodiments, messaging server 20 also schedules a scheduled task 110 for the intended recipient that specifies the relevant due date 112, at step 490. If appropriate, messaging server 20 may also associate a priority level with scheduled task 110. In particular embodiments, messaging server 20 may associate the priority level with scheduled task 110 by setting a field of scheduled task 110 to indicate the priority level of that scheduled task 110.

In the described embodiment, messaging server 20 also monitors the completion of scheduled tasks 110 and the due dates 112 assigned to these scheduled tasks 110. In such an embodiment, messaging server 20 may delegate the scheduled task 110 to another user if the due date 112 approaches or passes without scheduled task 110 being completed. For example, at step 500, messaging server 20 may determine whether the due date 112 has expired. If the due date 112 has not expired, messaging server 20 may continue monitoring the due date 112 of the scheduled task 110 and operation returns to step 500.

If the due date 112 of scheduled task 110 has expired, messaging server 20 may determine appropriate actions to take depending on the configuration of communication system 10 and the characteristics of the scheduled task 110 and/or the associated message 120. For example, in particular embodiments, messaging server 20 determines, at step 510, whether scheduled task 110 is a high-priority task. If scheduled task 110 is not a high-priority scheduled task 110, messaging server 20 may not take any action in response to the expiration of the due date 112 and operation ends. If, however, scheduled task 110 is a high-priority task, messaging server 20 may forward message 120 associated with the scheduled task 110 and/or the scheduled task 110 itself to another recipient. For example, in the described embodiment, messaging server 20 forwards message 120 to a supervisor of the recipient at step 520. Operation may then end.

Some of the steps illustrated in FIG. 3 may be combined, modified or deleted where appropriate, and additional steps may also be added to the flowchart. Additionally, steps may be performed in any suitable order without departing from the scope of the invention. Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing communication service, comprising:
    determining that a call was not answered by an intended recipient of the call;
    determining a priority level associated with the call, the priority level associated with the call determined irrespective of any due date associated with the call;
    after determining the priority level associated with the call, determining the due date associated with the call based on the priority level associated with the call, the due date indicating a deadline before which the intended recipient is to respond to the call; and communicating the due date to the intended recipient.

2. The method of claim 1, further comprising:
prompting a caller of the call to provide the priority level associated with the call; and
receiving the priority level from the caller.

3. The method of claim 1, wherein determining the due date comprises:
receiving a caller identifier that identifies a caller of the call; and
determining the due date based on the caller identifier and the priority level associated with the call.

4. The method of claim 1, wherein determining the due date comprises:
receiving a device identifier that identifies a device used by a caller to place the call; and
determining the due date based on at least a portion of the device identifier and the priority level associated with the call.

5. The method of claim 1, wherein determining the due date comprises determining the due date based on a destination device associated with the call and the priority level associated with the call.

6. The method of claim 1, further comprising:
determining that the due date has expired; and
in response to determining that the due date has expired, forwarding to another recipient a recorded voicemail message associated with the call.

7. The method of claim 1, further comprising automatically scheduling a task for the intended recipient based on the due date.

8. A device for providing communication service comprising:
a memory operable to store processor instructions; and
a processor coupled to the memory and operable to:
determine that a call was not answered by an intended recipient of the call;
determine a priority level associated with the call, the priority level associated with the call determined irrespective of any due date associated with the call;
after determining the priority level associated with the call, determine the due date associated with the call based on the priority level associated with the call, the due date indicating a deadline before which the intended recipient is to respond to the call; and
communicate the due date to the intended recipient.

9. The device of claim 8, wherein the processor is further operable to:
prompt a caller of the call to provide the priority level associated with the call; and
receive the priority level from the caller.

10. The device of claim 8, wherein the processor is operable to determine the due date by:
receiving a caller identifier that identifies a caller of the call; and
determining the due date based on the caller identifier and the priority level associated with the call.

11. The device of claim 8, wherein the processor is operable to determine the due date by:
receiving a device identifier that identifies a device used by a caller to place the call; and
determining the due date based on at least a portion of the device identifier and the priority level associated with the call.

12. The device of claim 8, wherein the processor is operable to determine the due date by determining the due date based on a destination device associated with the call and the priority level associated with the call.

13. The device of claim 8, wherein the processor is further operable to:
determine that the due date has expired; and
forward a recorded voicemail message associated with the call to another recipient, in response to determining that the due date has expired.

14. The device of claim 8, wherein processor is further operable to automatically schedule a task for the intended recipient based on the due date.

15. A system for providing communication service comprising:
a first communication device operable to initiate a call to a second communication device;
the second communication device;
a call manager operable to forward the call to a messaging server if a recipient associated with the second communication device does not answer the call;
a messaging server operable to:
determine that the call was not answered by the recipient associated with the second communication device;
determine a priority level associated with the call, the priority level associated with the call determined irrespective of any due date associated with the call;
after determining the priority level associated with the call, determine the due date associated with the call based on the priority level associated with the call, the due date indicating a deadline before which the intended recipient is to respond to the call; and
communicate the due date to the intended recipient; and
a scheduling device operable to communicate the due date to the intended recipient.

16. The system of claim 15, wherein the messaging server is further operable to:
prompt a caller of the call to provide the priority level associated with the call; and
receive the priority level from the caller.

17. The system of claim 15, wherein the messaging server is operable to determine the due date associated with the call by:
receiving a caller identifier that identifies a caller of the call; and
determining the due date based on the caller identifier and the priority level associated with the call.

18. The device of claim 15, wherein the messaging server is operable to determine the due date based on a destination device associated with the call and the priority level associated with the call.

19. The system of claim 15, wherein the messaging server is operable to determine the due date by:
receiving a device identifier that identifies a device used by a caller to place the call; and
determining the due date based on at least a portion of the device identifier and the priority level associated with the call.

20. The system of claim 15, wherein the messaging server is further operable to:
determine that the due date has expired; and
forward a recorded voicemail message associated with the call to another recipient, in response to determining that the due date has expired.

21. The system of claim 15, wherein the messaging server is further operable to automatically schedule a task for the intended recipient based on the due date.

22. A system for providing communication service comprising:
- means for determining that a call was not answered by an intended recipient of the call;
- means for determining a priority level associated with the call, the priority level associated with the call determined irrespective of any due date associated with the call;
- means for, after determining the priority level associated with the call, determining the due date associated with the call based on the priority level associated with the call, the due date indicating a deadline before which the intended recipient is to respond to the call; and
- means for communicating the due date to the intended recipient.

23. The method of claim 1, wherein communicating the due date to the intended recipient comprises communicating the due date to the intended recipient without communicating the entire contents of a message associated with the unanswered call to the intended participant.

24. The method of claim 1, wherein the due date associated with the call comprises a due date for responding to call.

25. The method of claim 1, wherein the due date associated with the call comprises a due date for performing a task associated with the call.

* * * * *